United States Patent
Gibbens et al.

(10) Patent No.: US 11,392,726 B2
(45) Date of Patent: Jul. 19, 2022

(54) VARIATIONAL MODELING METHOD AND SYSTEM FOR EDITING OF GEOMETRIC OBJECTS

(71) Applicant: Siemens Industry Software Inc., Plano, TX (US)

(72) Inventors: Michael John Gibbens, Cambridge (GB); Douglas Joseph King, Peterborough (GB); Howard Charles Duncan Mattson, Impington (GB); Jeremy Rogers, Milton (GB)

(73) Assignee: Siemens Industry Software Inc., Plano, TX (US)

( * ) Notice: Subject to any disclaimer, the term of this patent is extended or adjusted under 35 U.S.C. 154(b) by 532 days.

(21) Appl. No.: 16/334,603

(22) PCT Filed: Sep. 28, 2016

(86) PCT No.: PCT/EP2016/073125
§ 371 (c)(1),
(2) Date: Mar. 19, 2019

(87) PCT Pub. No.: WO2018/059678
PCT Pub. Date: Apr. 5, 2018

(65) Prior Publication Data
US 2021/0232716 A1    Jul. 29, 2021

(51) Int. Cl.
*G06F 30/10*    (2020.01)
*G06F 111/04*    (2020.01)
(52) U.S. Cl.
CPC .......... *G06F 30/10* (2020.01); *G06F 2111/04* (2020.01)

(58) Field of Classification Search
CPC ............................ G06F 30/10; G06F 2111/04
See application file for complete search history.

(56) References Cited

U.S. PATENT DOCUMENTS

| | | | |
|---|---|---|---|
| 7,295,958 B1 * | 11/2007 | Suh .......................... | G06F 30/00 703/7 |
| 2008/0316204 A1 * | 12/2008 | Deslandes ............... | G06F 30/17 345/419 |

(Continued)

FOREIGN PATENT DOCUMENTS

| | | | | |
|---|---|---|---|---|
| EP | 3038060 A1 * | 6/2016 | ............. | G06F 17/10 |
| JP | 2015525919 | * 9/2015 | .......... | G06F 2111/04 |

(Continued)

OTHER PUBLICATIONS

Dassault Systemes; http://help.solidworks.com/2015/english/SolidWorks/cworks/c_coordinate_systems.htm?verRedirect=1; (Year: 2015).*

(Continued)

*Primary Examiner* — Rehana Perveen
*Assistant Examiner* — Nupur Debnath
(74) *Attorney, Agent, or Firm* — Wolter Van Dyke Davis, PLLC

(57) ABSTRACT

A method of automatically identifying a network of geometries is performed on a data processing system. The method includes receiving one or more geometries having all or part of a network of geometries; recognizing adjacent tangencies to automatically identify another geometry in the network, or to determine that each geometry is connected to its neighbor through adjacent tangencies; repeating the recognition step until all geometries forming the network of geometries have been determined; and labelling the identified network as a slotdog.

18 Claims, 14 Drawing Sheets

(56) References Cited

U.S. PATENT DOCUMENTS

| | | | | |
|---|---|---|---|---|
| 2009/0256843 | A1* | 10/2009 | Dedhia | G06T 17/10 345/420 |
| 2011/0185272 | A1* | 7/2011 | Rajkumar | G06F 30/00 715/234 |
| 2012/0078581 | A1* | 3/2012 | Mattson | G06F 30/17 703/1 |
| 2014/0324394 | A1* | 10/2014 | Mattson | G06F 30/00 703/1 |
| 2015/0261889 | A1* | 9/2015 | Mattson | G06F 30/00 703/1 |
| 2015/0362914 | A1* | 12/2015 | DeSimone | B26F 3/004 700/118 |
| 2016/0210377 | A1* | 7/2016 | Bumbalough | G06F 30/13 |
| 2016/0246899 | A1* | 8/2016 | Hirschtick | G06F 30/17 |

FOREIGN PATENT DOCUMENTS

| | | | | |
|---|---|---|---|---|
| JP | 2015525920 | * | 9/2015 | G06F 2111/04 |
| WO | 2015142511 | A1 | 9/2015 | |

OTHER PUBLICATIONS

FEKO Comprehensive Electromagnetic Solutions User manual Suite 7.0; (Year: 2014).*

B. Kumar, J.C. Robert, R. Hoffman, K. Ikeuchi, T. Kanade; Vantage a Frame-Based Geometric Modeling System Programmer/User's Manual V2.0; The Robotics Institute Carnegie Mellon University (Year: 1991).*

Solid Edge fundamentals; https://support.industrysoftware.automation.siemens.com/training/se/en/ST4/pdf/mt01413-s-1040_en.pdf; Publication No. mt01413-s-1040; © 2011 Siemens Product Lifecycle Management Software Inc. (Year: 2011).*

Alexander Agathos et al.; "Protrusion-oriented 3D Mesh Segmentation"; Article in the Visual Computer • Aug. 2010 (Year: 2010).*

Michael Garland et al.; "Hierarchical Face Clustering on Polygonal Surfaces"; © ACM 2001 1-58113-292 (Year: 2001).*

International search report and written opinion dated Jun. 12, 2017, for corresponding PCT/EP2016/073125.

* cited by examiner

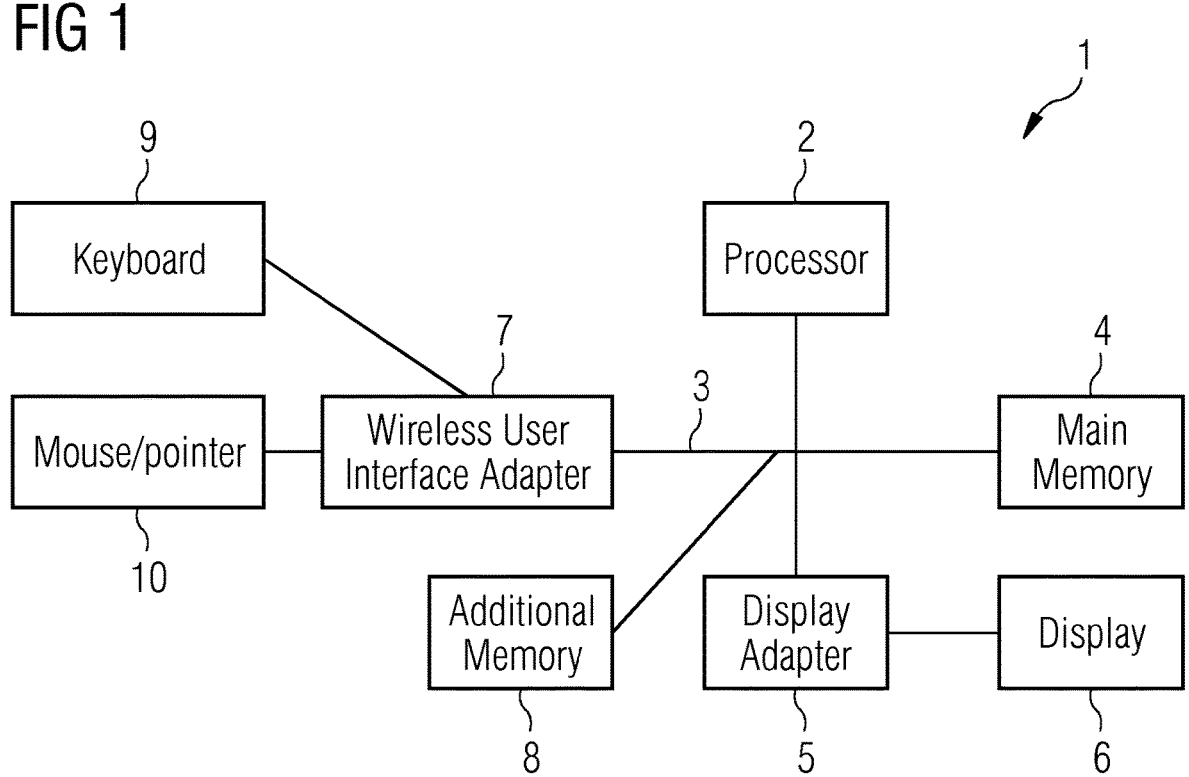

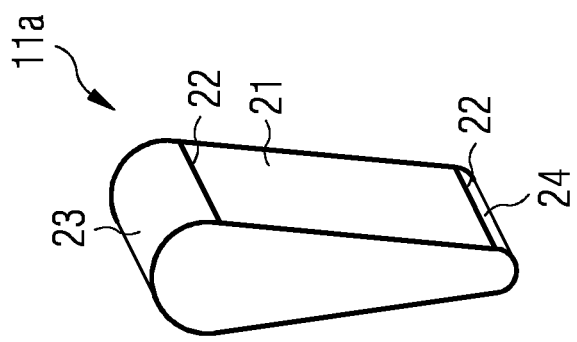
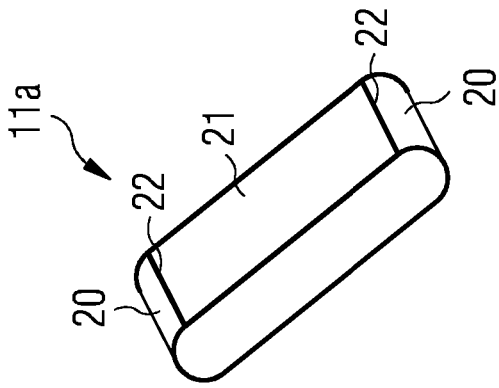
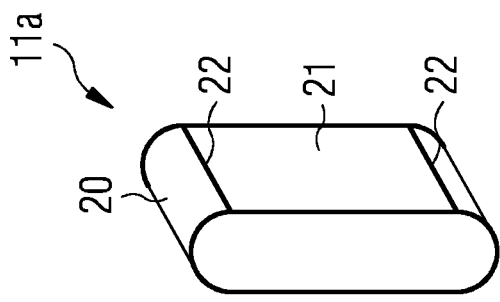

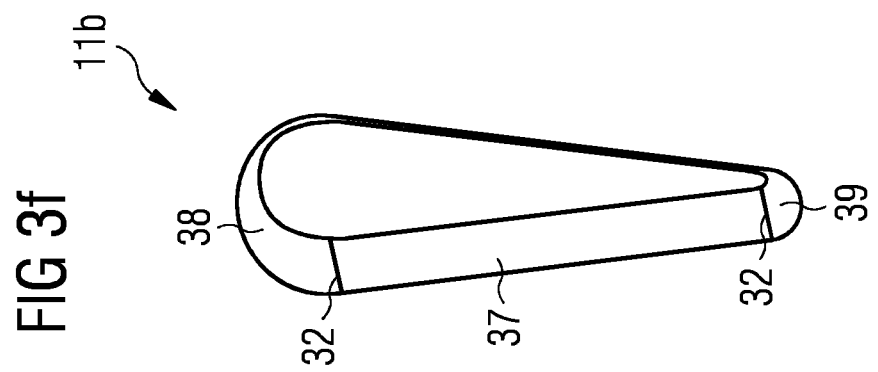
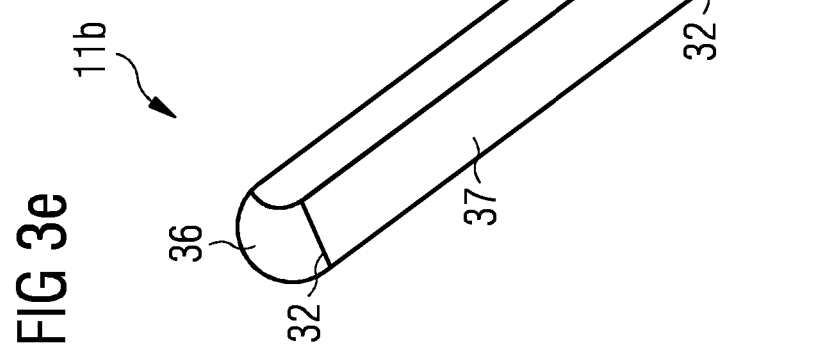
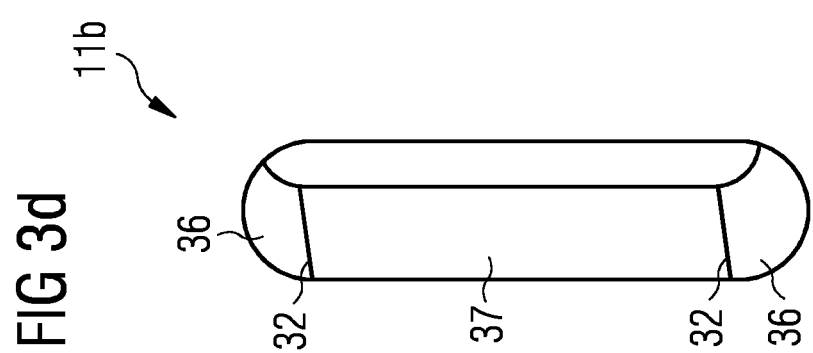

FIG 6a
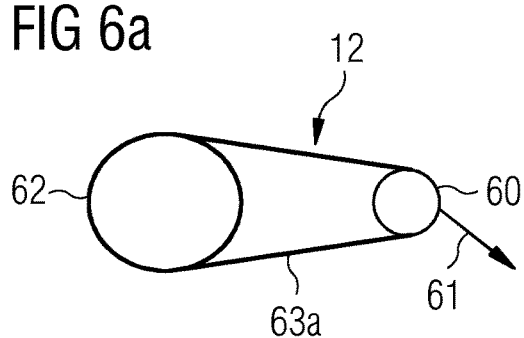 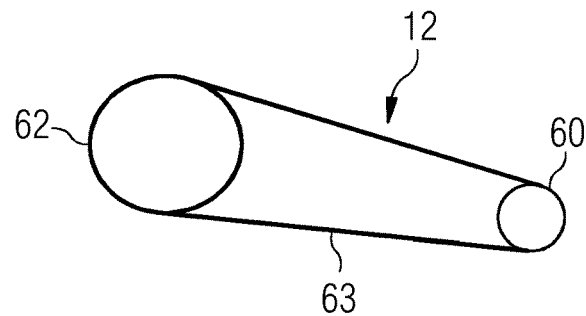
FIG 6b
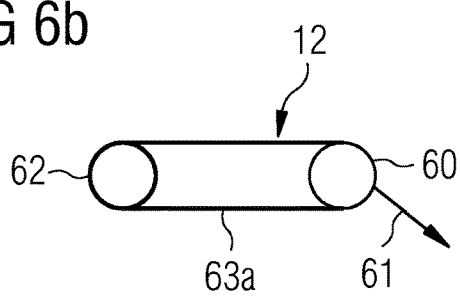 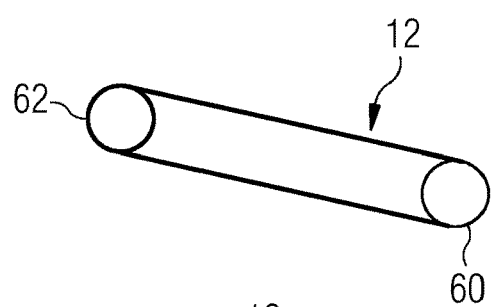
FIG 6c
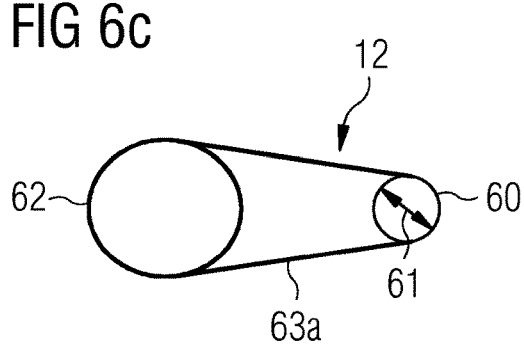 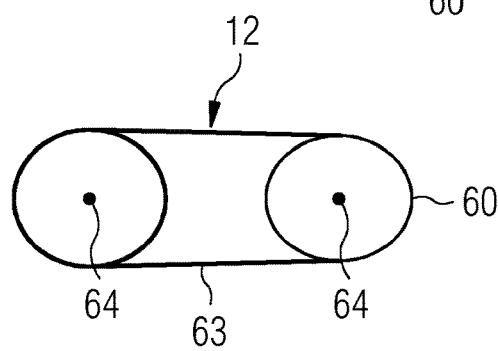
FIG 6d
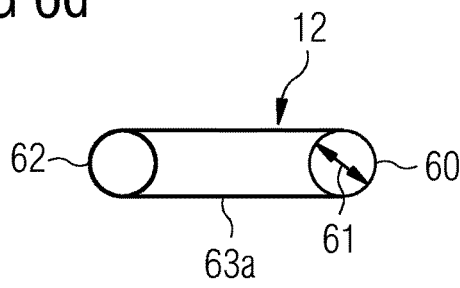 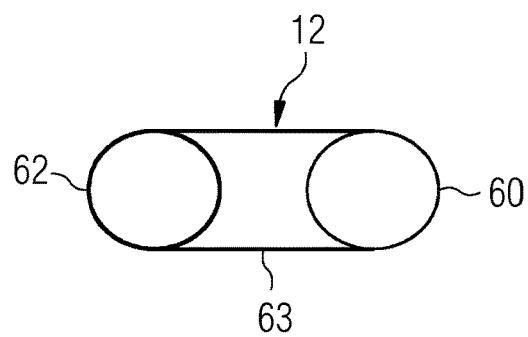
FIG 6e
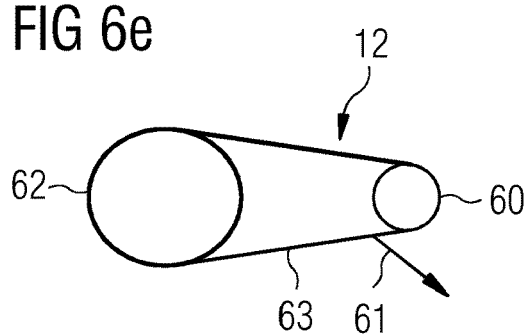 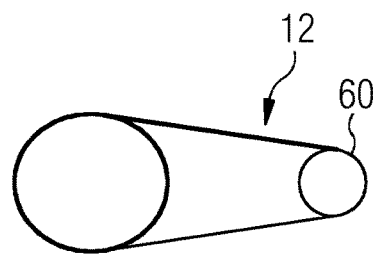

FIG 6f
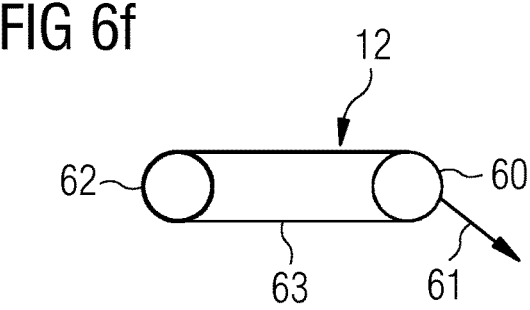 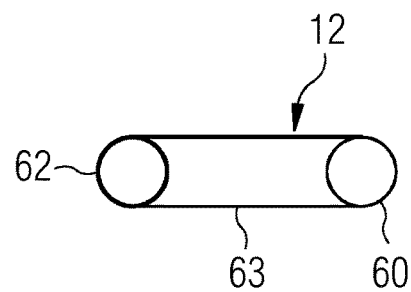
FIG 6g
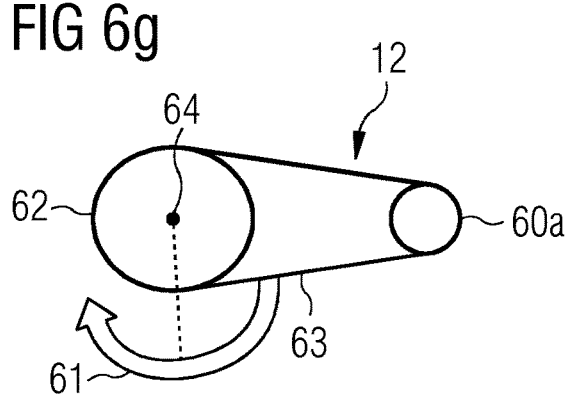 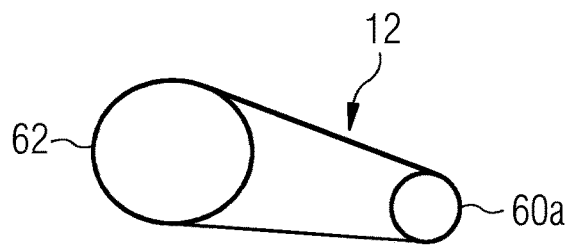
FIG 6h
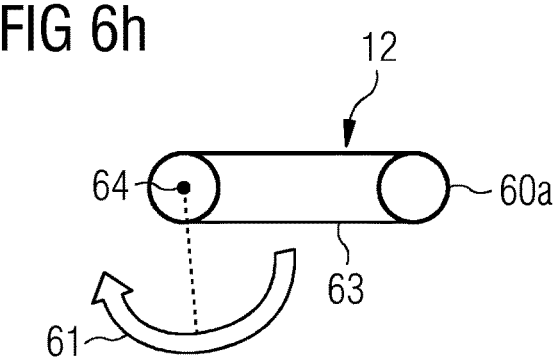 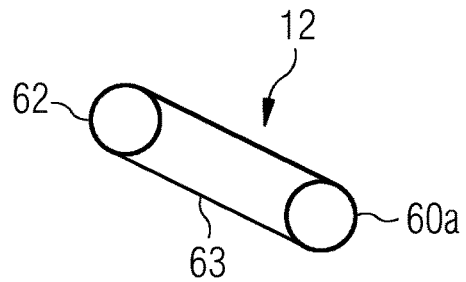
FIG 6i
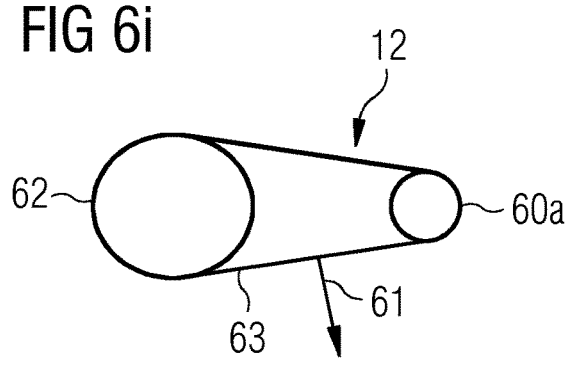 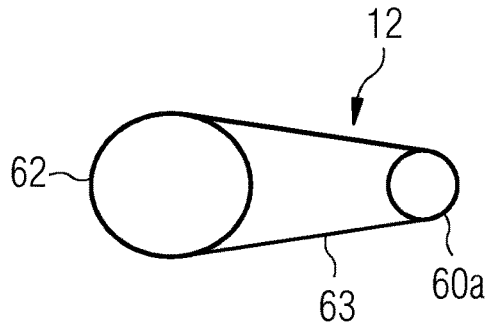

FIG 6j
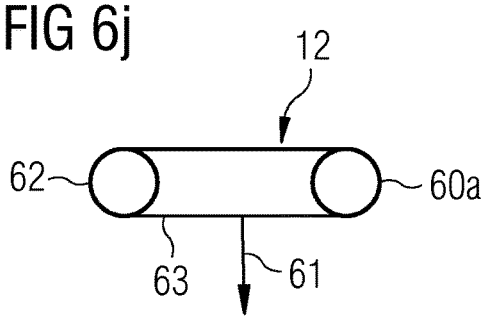 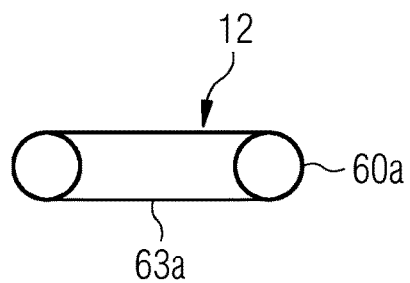
FIG 6k
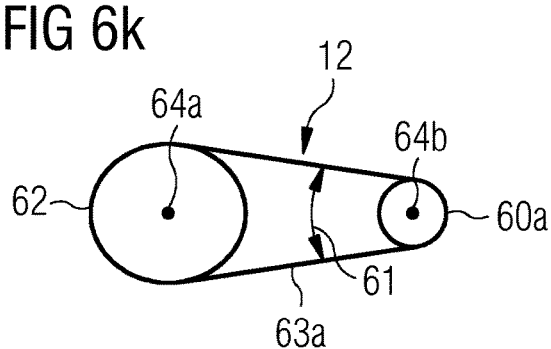 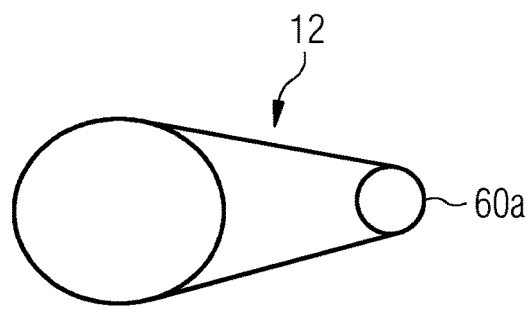
FIG 6l
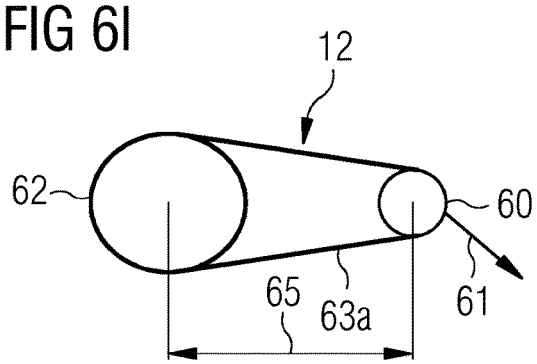 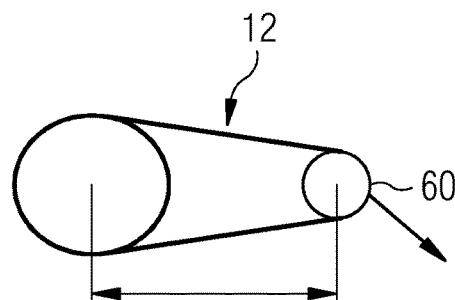
FIG 6m
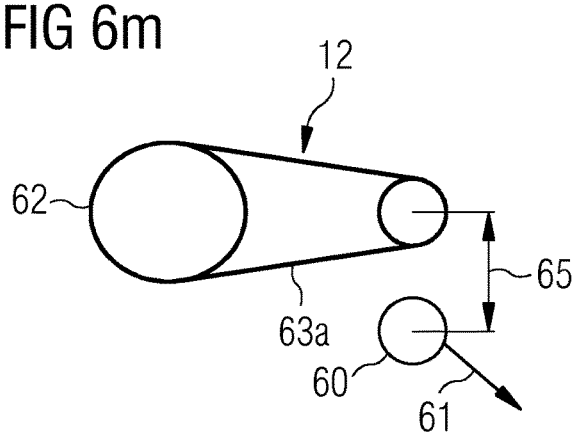 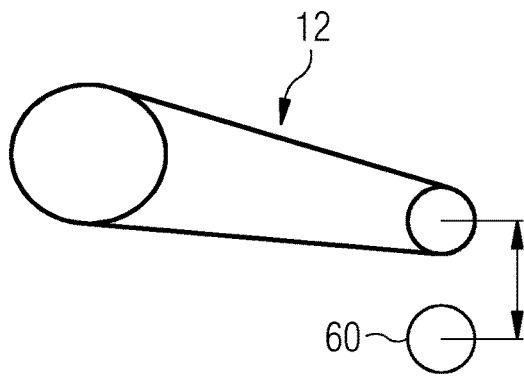

VARIATIONAL MODELING METHOD AND SYSTEM FOR EDITING OF GEOMETRIC OBJECTS

CROSS REFERENCE TO RELATED APPLICATIONS

This application is the US National Stage of International Application No. PCT/EP2016/073125 filed Sep. 28, 2016, and claims the benefit thereof. The PCT application is incorporated by reference herein in its entirety.

TECHNICAL FIELD

This present disclosure relates to the general field of computer aided design, drafting ("CAD"), manufacturing ("CAM") and visualisation systems (individually and collectively "CAD systems"), product lifecycle management ("PLM") systems, and similar systems, that manage data for products and other items (collectively, "Product Data Management" systems or PDM systems).

BACKGROUND OF THE DISCLOSURE

PDM systems manage PLM and other data. Improved methods and systems are desirable.

SUMMARY OF THE DISCLOSURE

Various disclosed embodiments include methods for automatically identifying a network of geometries in a modelling system.

A method of automatically identifying a network of geometries performed on a data processing system may comprise receiving one or more geometries comprising all or part of a network of geometries; recognising adjacent tangencies to automatically identify another geometry in the network of geometries, or to determine that each geometry is connected to a neighbour through one or more adjacent tangencies; repeating the recognition step until all geometries forming the network of geometries have been determined; and labelling the identified network of geometries as a slotdog.

A data processing system may include a processor; and an accessible memory, the data processing system particularly configured to carry out the steps of automatically identifying a network of geometries, by receiving one or more geometries comprising all or part of the network of geometries; recognising adjacent tangencies to automatically identify another geometry in the network of geometries, or to determine that each geometry is connected to a neighbour through one or more adjacent tangencies; repeating the recognition step until all geometries forming the network of geometries have been determined; and labelling the identified network of geometries as a slotdog.

A non-transitory computer-readable medium may be encoded with executable instructions that, when executed, cause one or more data processing systems to perform a method of automatically identifying a network of geometries, the method performed on a data processing system, the method comprising receiving one or more geometries comprising all or part of a network of geometries; recognising adjacent tangencies to automatically identify another geometry in the network of geometries, or to determine that each geometry is connected to a neighbour through one or more adjacent tangencies; repeating the recognition step until all geometries forming the network of geometries have been determined; and labelling the identified network of geometries as a slotdog.

The foregoing has outlined rather broadly the features and technical advantages of the present disclosure so that those skilled in the art may better understand the detailed description that follows. Additional features and advantages of the disclosure will be described hereinafter that form the subject of the claims. Those skilled in the art will appreciate that they may readily use the conception and the specific embodiment disclosed as a basis for modifying or designing other structures for carrying out the same purposes of the present disclosure. Those skilled in the art will also realize that such equivalent constructions do not depart from the scope of the disclosure in its broadest form.

Before undertaking the DETAILED DESCRIPTION below, it may be advantageous to set forth definitions of certain words or phrases used throughout this patent document: the terms "include" and "comprise," as well as derivatives thereof, mean inclusion without limitation; the term "or" is inclusive, meaning and/or; and the term "controller" means any device, system or part thereof that controls at least one operation, whether such a device is implemented in hardware, firmware, software or some combination of at least two of the same. It should be noted that the functionality associated with any particular controller may be centralized or distributed, whether locally or remotely. Definitions for certain words and phrases are provided throughout this patent document, and those of ordinary skill in the art will understand that such definitions apply in many, if not most, instances to prior as well as future uses of such defined words and phrases. While some terms may include a wide variety of embodiments, the appended claims may expressly limit these terms to specific embodiments.

BRIEF DESCRIPTION OF THE DRAWINGS

An example of method and system according to the present disclosure will now be described with reference to the accompanying drawings in which:

FIG. 1 is a block diagram of a data processing system in which an embodiment can be implemented;

FIGS. 2a to 2f illustrate examples of protrusions to which the method of the present disclosure may be applied;

FIGS. 3a to 3f illustrate examples of slots to which the method of the present disclosure may be applied;

FIGS. 6a to 6m illustrate selected seeds and operation and their associated desired result for the disclosed embodiments;

DETAILED DESCRIPTION

Figure 2F:
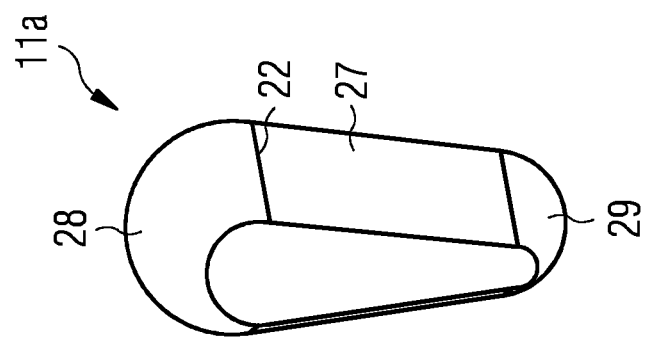

The embodiments of FIGS. 1 to 12 used to describe the principles of the present disclosure in this document are by way of illustration only and should not be construed in any way to limit the scope of the disclosure. Those skilled in the art will understand that the principles of the present disclosure may be implemented in any suitably arranged device, apparatus, system, or method.

FIG. 1 illustrates an example of a data processing system in which an embodiment of the present disclosure may be implemented, for example a CAD system configured to perform processes as described herein. The data processing system 1 comprises a processor 2 connected to a local system bus 3. The local system bus connects the processor to a main memory 4 and graphics display adaptor 5, which may be connected to a display 6. The data processing system may communicate with other systems via a wireless user interface adapter connected to the local system bus 3, or via a wired network, e.g. to a local area network. Additional memory 8 may also be connected via the local system bus. A suitable adaptor, such as wireless user interface adapter 7, for other peripheral devices, such as a keyboard 9 and mouse 10, or other pointing device, allows the user to provide input to the data processing system. Other peripheral devices may include one or more I/O controllers such as USB controllers, Bluetooth controllers, and/or dedicated audio controllers (connected to speakers and/or microphones). It should also be appreciated that various peripherals may be connected to the USB controller (via various USB ports) including input devices (e.g., keyboard, mouse, touch screen, trackball, camera, microphone, scanners), output devices (e.g., printers, speakers), or any other type of device that is operative to provide inputs or receive outputs from the data processing system. Further it should be appreciated that many devices referred to as input devices or output devices may both provide inputs and receive outputs of communications with the data processing system. Further it should be appreciated that other peripheral hardware connected to the I/O controllers may include any type of device, machine, or component that is configured to communicate with a data processing system. Further, systems may use other types of input devices to provide inputs for manipulating objects such as a mouse, pointer, touch pad, drawing tablet, track ball, joystick, keypad, keyboard, camera, motion sensing device that captures motion gestures, or any other type of input device capable of providing the inputs described herein.

In CAD systems, a user may wish to model a design for an object, generate manufacturing instructions for manufacturing that object, or make modifications to the design or manufacturing instructions. Modifications to the design may have an impact on another part to which the object must fit, or match when constructed, so it is desirable to achieve consistent behaviour when an edit is applied to any element of a shape. Certain shapes, as discussed below, are prone to inconsistent behaviour when edited, if their real nature is not correctly determined.

The present disclosure relates to a system and method for controlling behaviour of tangent cuts and protrusions in a variational system. Cuts and protrusions made from multiple tangent planes, cylinders and cones are very common within a 3D CAD model. In 2D similar shapes are commonly found between lines and arcs. When editing these common shapes within a variational system, such as Synchronous Technology, the generic and often underdefined behaviour produced does not always match the specific behaviour expected by an engineering user.

Figure 2E:
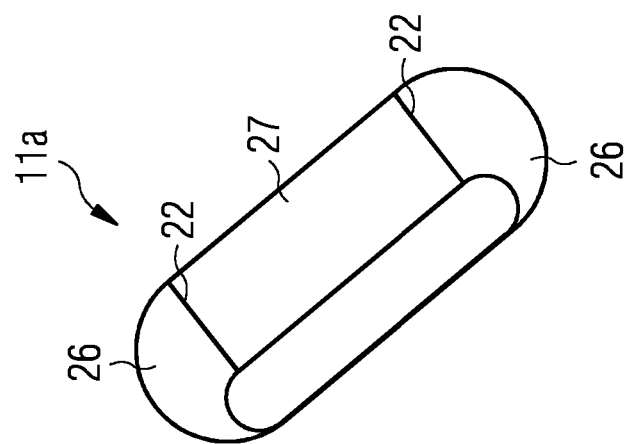
Figure 2D:
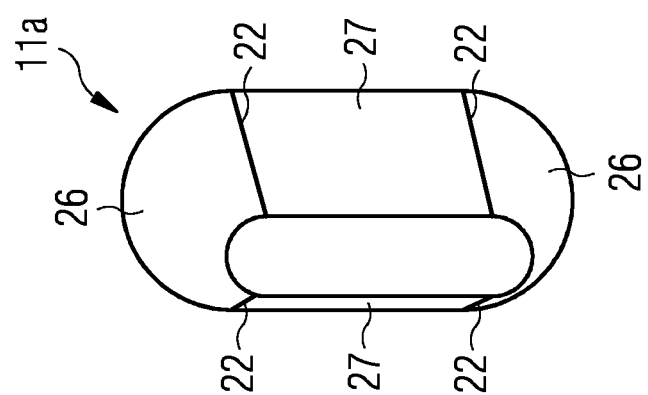

FIGS. 2a to 2f show some examples of the shapes in question: These types of protrusion are often referred to as hotdogs 11a. FIG. 2a contains two cylinders 20 having the same radius, two parallel planes 21 and four tangencies 22 between them. It is aligned to the vertical principle axis of the model. FIG. 2b is similar to the FIG. 2a with two cylinders 20 having the same radius, two connecting planes 21, parallel to one another and four tangencies 22 between them, but is not aligned to any principle axes, i.e. X, Y, Z. FIG. 2c also contains two cylinders 23, 24, two planes 21 and four tangencies 22 between them as in FIG. 2a, but the cylinders 23, 24 are not of the same radius as each other and therefore the connecting planes 21 are not parallel. FIG. 2d contains two same radius cones 26, two planes 27 and four tangencies 22 between them. It is aligned to the vertical principle axis of the model. FIG. 2e is similar to FIG. 2d, in that it contains two same radius cones 26, two planes 27 and four tangencies 22 between them, but it is not aligned to any principle axes. FIG. 2f contains two cones 28, 29, two planes 27 and four tangencies 22 between them, but the cones are not the same radius as each.

Figure 3A:
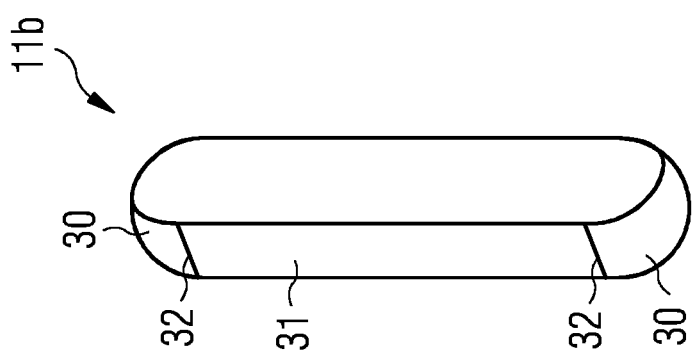
Figure 3B:
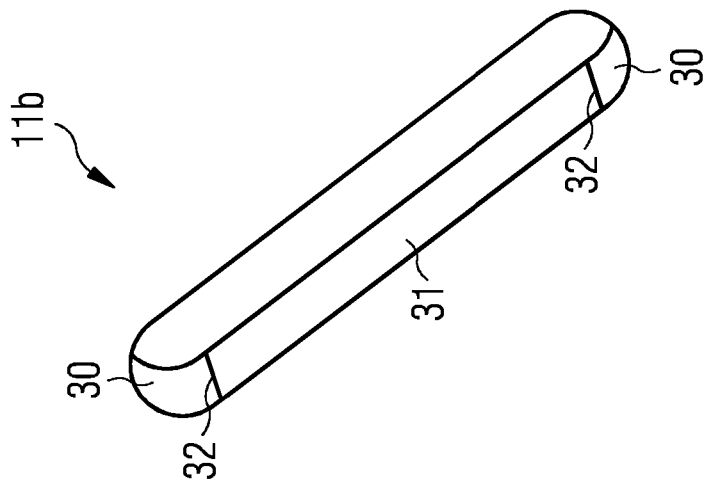
Figure 3C:
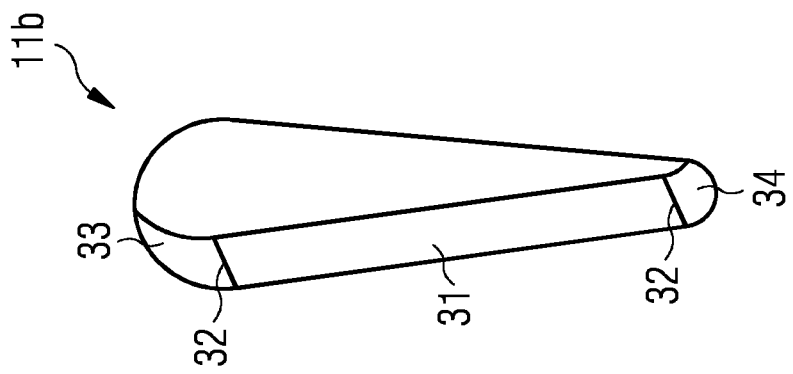

FIGS. 3a to 3f show further examples of the shapes in question. These types of cuts are often referred to as slots 11b. As with the FIG. 2a case, FIG. 3a contains two same radius cylinders 30, two connecting planes 31, parallel to one another and four tangencies 32 between them. The slot is aligned to the vertical principle axis of the model. FIG. 3b contains two same radius cylinders 30, two parallel planes 31 and four tangencies 32 between them, as in the FIG. 3a case, but the slot is not aligned to any principle axes. FIG. 3c again contains two cylinders 33, 34, two planes 31 and four tangencies 32 between them, but the cylinders are not the same radius as each other and therefore the connecting planes 31 are not parallel. FIG. 3d contains two same radius cones 36, two planes 37 and four tangencies 32 between them. The slot is aligned to the vertical principle axis of the model. FIG. 3e contains two same radius cones 36, two planes 37 and four tangencies 32 between them as in FIG. 3d, but the slot is not aligned to any principle axes. FIG. 3f also contains two cones 38, 39, two planes 37 and four tangencies 32 between them, but the cones are not the same radius as each other.

Figure 4C:
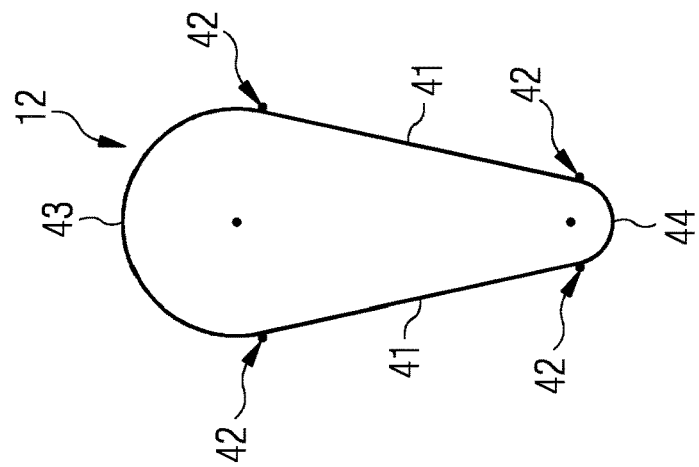
FIGS. 4a to 4c illustrate 2-D versions of example of slots or protrusions to which the method of the present disclosure may be applied.
Figure 4B:
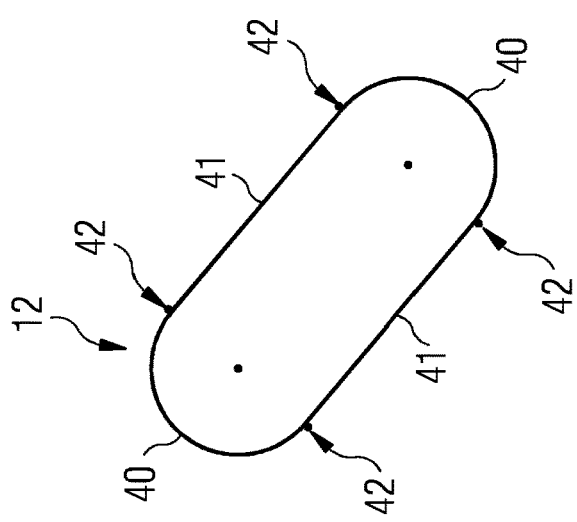
Figure 4A:
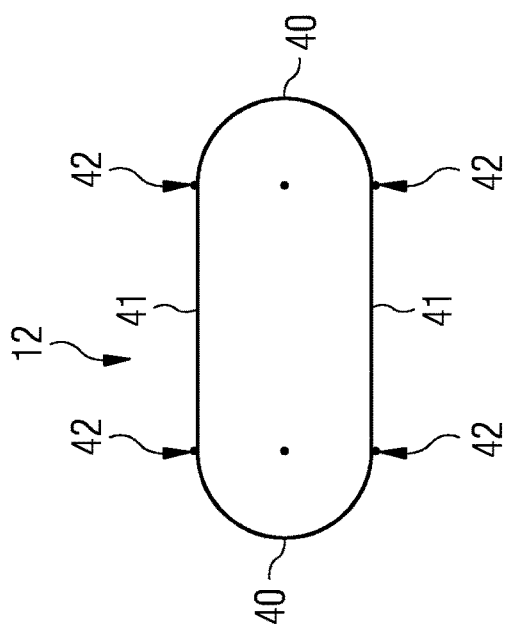
Figure 5A:
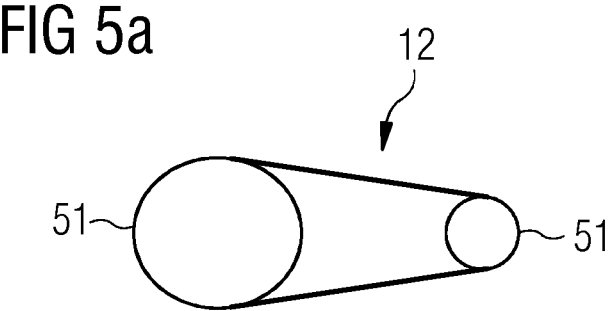
FIGS. 5a to 5d illustrate terminology used in the present disclosure.
Figure 5B:
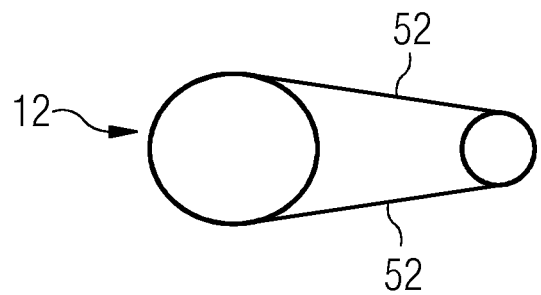
Figure 5C:
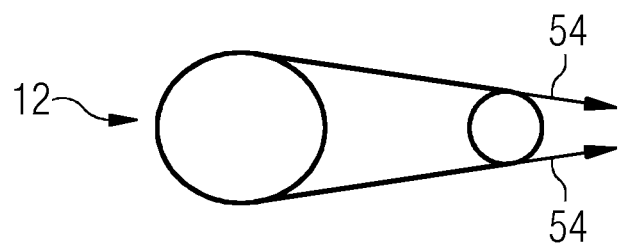
Figure 5D:
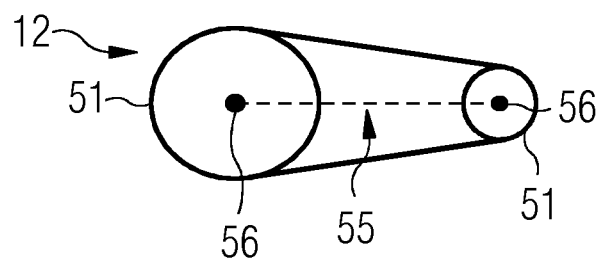

As illustrated in FIGS. 4a to 4c, there are also 2D versions of slots, or hotdogs. FIG. 4a has two same radius arcs 40 connected to two parallel lines 41. The connection 42 is tangent-at-vertex. FIG. 4b has two same radius arcs 40 connected at connection 42 to two parallel lines 41 as in FIG. 4a, but the shape so formed is not aligned to the vertical direction. FIG. 4c also has two arcs 43, 44 connected to two lines 41 at connections 42, but with different radius arcs, rather than same radius arcs, so the lines are not parallel.

The cut and protrusion situations shown in FIGS. 2a to 2f, 3a to 3f, and 4a to 4c are geometrically similar and the user would expect similar behaviour in each when editing. For the purpose of this disclosure, the term "slotdog" 12 is used to cover both the slot 11b and hotdog 11a cases, a slotdog 12 comprising a network of geometries all connected through adjacent tangencies. The geometries may comprise axial end entities, such as arcs, circles, cylinders, or cones and straight connectors, such as lines, or planes. Typically, there are two axial end entities in a slotdog, i.e. two arcs, two circles, two cylinders, or two cones.

It is desirable that a variational editing system has functionality to make changes to 2D and 3D CAD models intuitively. When making edits in a variational system, to get desirable behaviour there are two options. The first is to fully define the system and expose methods for exercising particular freedoms to the user. This typically involves providing dimensions to be edited, or geometry which can be moved, thus forcing the model to solve to match the new position. The second is to work with an underdefined model where it is possible to just move geometry, or change dimensions, where needed, within the freedoms that are available in the system. Typically additional constraints, dimensions and features may be defined to influence how the model behaves.

An advantage of variational system using the second approach, i.e. using an underdefined model, is that the user can easily make edits to a given 3D or 2D model without needing to understand how the constraint scheme was constructed. However, inherent within this approach is the underdefined nature of the resulting changes, which can sometimes be confusing and frustrating to the user. This is particularly true when geometries are connected with constraints, but those constraints do not fully define the relationship between the geometries. For example, a tangency between a moving plane and a cylinder may be satisfied by moving the cylinder in a number of different directions, or by changing the radius of the cylinder and keeping it stationary, or by a combination of both. With no further information a solver will simply make the relationship true by whatever means it sees fit.

In the slotdog models of FIGS. 2a to 2f, 3a to 3f, and 4a to 4c, discussed above, the network of geometries are all connected through the adjacent tangencies, and so not connected in a well-defined fashion. This means, when being solved, undesirable behaviour is often experienced by the user. The present disclosure details a general method for automatically identifying slotdogs and defining the behaviour of the various slotdog model entities to give the user intuitive behaviour when being edited directly, or indirectly.

Certain terminology used in the present disclosure is explained with reference to FIGS. 5a to 5d. Axial end entities 51 are the cones, cylinders, arcs, or circles of the slotdog 12. Straight connectors 52 are the planar faces or lines that connect the axial ends. Tangent end lines 54 refer to a line that is positioned on one of the tangent edges or vertices, and has a direction that is parallel to both the adjacent straight connector 52 and axis of the adjacent axial end entity 51. The tangent end lines 54 point away from the slotdog 12. Slotdog length 55 is the distance between the axes 56 of the axial end entities 51.

In order to address the behaviour problems outlined above, a generic definition of a slotdog may be used when discovering the slotdog within a 2D or 3D model and when defining its desired behaviour. For example, an ordered set of preferential behavioural characteristics to be applied to the slotdog may be defined along with a method for implementing those behavioural characteristics making use of 'if possible' constraints.

Figure 9:
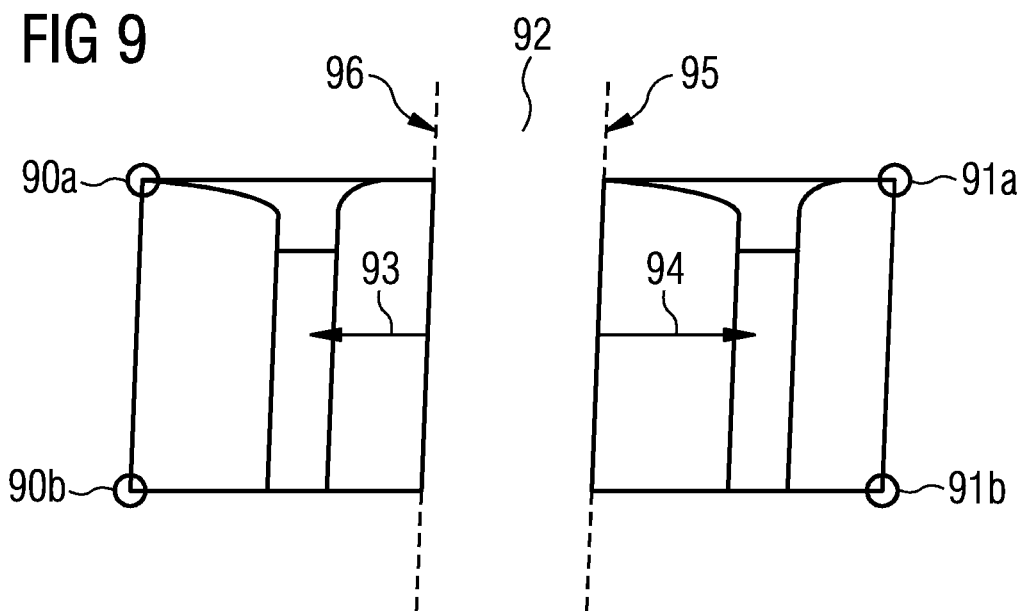
FIG. 9 illustrates an example in which a face is not a straight connector.

For the purpose of this disclosure, a slotdog comprises four faces, geometries, or entities, that are topologically connected in a loop, where each entity is connected to exactly two of the other entities, or more than four faces, geometries, or entities which may be merged and treated as one. Each one of the four geometries may individually be formed by multiple/identical/split geometries. The entities are tangent at their connections and the entities comprise two straight connectors, which are not topologically connected and two axial end entities. The two straight connectors must not be coincident. The axial end entities may be cylinders, or cones, or circles, or a subsection thereof. The straight connectors may be lines or planes. If the slotdog contains cones, the cones may have the same half-angle and aligned axes. If the slotdog contains cylinders or circles, the cylinders or circles may have parallel axes. The axial ends may curve out from the centre of the slotdog. When the straight connectors are faces, the majority of the face may lie between the two cylindrical or conical ends, for example as illustrated in FIG. 9. Each plane may be replaced by multiple identical planes, i.e. it is possible to split the straight connectors into multiple pieces, where the definition of the line/plane is still the same and similarly for the end arcs, or cylinders, or cones.

FIGS. 6a to 6m show examples of desirable behaviour characteristics applied to a slotdog. In these figures, references 60, 63 denote a seed, a seed being one or more of the axial end entities 60 or straight connectors 63 of a slotdog and reference 61 indicates the operation applied to the seed. Reference number 60a is used for an axial end entity which is not a seed in a particular example and 63a is a straight connector which is not a seed in a particular example. When an indication of a change is received, whether as an explicit selection of a seed, or as an automatic behaviour of the system, that indication may identify a particular seed and from this indication a slotdog may be derived. For simplicity in the examples, a radius change is referred to in these examples, but similar results for conical slotdogs may be achieved for example, by offsetting the cone face. In FIG. 6a, an operation 61 is applied to a seed, in this case axial end 60, with the other axial end 62 remaining unchanged. The straight connectors 63a rotate to maintain tangency. FIG. 6b shows another example of this. An operation 61 is applied to the seed, axial end 60, with the other axial end 62 remaining unchanged. The straight connectors 63a rotate to maintain tangency. In FIG. 6c, an operation 61 is applied to the seed, axial end 60, but in this case the operation increases the radius of the end 60 whilst the other axial end 62 remains unchanged. This causes the straight connectors 63a to rotate to maintain tangency. The axes 64 of the axial ends do not move. In FIG. 6d, an operation applied to the seed, axial end 60, increases the radius of the end 60 and so the other axial end 62 also changes radius to maintain parallel straight connectors 63a. The axes 64 of the axial ends do not move.

The operation 61 applied in FIG. 6e to the seed, in this case one axial end 60 and one straight connector 63, moves the slotdog 12 rigidly. Radii are maintained and length is maintained. The same applies for the operation applied in FIG. 6f to the seed, which is one axial end 60 and one straight connector 63, the slotdog 12 moves rigidly, radii are maintained and length is maintained. In FIGS. 6g to 6j, the seed is a straight connector 63. Axial end entity 60a is not a seed in these examples. In FIG. 6g, the operation 61 applied to a straight connector 63 rotates rigidly around the centre of rotation, axis 64. Radii are maintained and length is maintained. In FIG. 6h, the operation 61 applied to a straight connector 63, rotates rigidly around the centre of rotation 64. Radii are maintained and length is maintained.

In FIG. 6i, the operation 61 applied to a seed, straight edge 63, causes the slotdog 12 to move rigidly. Radii are maintained and length is maintained. The same applies in FIG. 6j, the slotdog 12 moves rigidly, radii are maintained and length is maintained. In FIG. 6k, the operation 61 applied causes the radius of the larger end 62 to change, but the axes 64a, 64b of the axial ends 60a, 62 do not move. Straight connectors 63a rotate around the center 64a of the smaller axial end 60. In FIG. 6l, a predetermined dimension 65 between the axial ends is maintained in preference to any other slotdog behaviours. FIG. 6m illustrates that a slotdog should also behave correctly under indirect edit. In this case, the predetermined dimension 65 forces one end 60 to move, so the slotdog 12 stretches in a similar way to the example of FIG. 6a.

The desired behaviour in the system may be implemented by using a mixture of traditional constraints and if-possible constraints. An if-possible constraint is one which is only imposed if the system does not become over-defined once applied. Unlike traditional constraints, if-possible constraints require an order of preference for them to be imposed because imposing one could mean a later if-possible constraint cannot be imposed. Certain ordered general behaviour characteristics have been identified as desirable within a slotdog. If an operation is applied to a slotdog, then the tangency between the straight connectors and the axial end faces must always be maintained—the tangent property holds true, whatever else may change. When tangent end lines are parallel they may remain parallel, if possible. Radius or half-angle or cone-slide of each axial end may be locked, with preference for the smaller end being locked, if possible. The axis of each axial end may remain stationary, with preference for the furthest away from the edit remaining stationary, if possible. The length of the slotdog, i.e. distance between the end axes, may remain rigid if both axial ends are moving, if possible. The 'if possible' behaviours listed above should not override other required explicit or automatic desired behaviours imposed by the system, in order that the slotdog detection and editing works in concert with the wider system. An example of such key synchronous behaviours for the system being "keep-orthogonal."

The following additional special characteristics may also apply. The axial end entities may never be treated as blends, as blends have their own associated behaviours. Except for symmetry, no other relationships may be discoverable between entities within the slotdog, as this may affect the ability of the slotdog to change its shape correctly, in accordance with the operation being applied, whilst maintaining its essential relationships. When identified as rotating, the straight connectors may rotate around the axial end entities, if possible. When the angle between the tangent end lines is being specifically edited, for example via an angle relation, the axis of each axial end may remain stationary, if possible.

The table below summarises an example of the constraints that may be applied to the slotdog entities and the order in which they are applied. The requirement for maintaining tangency is not optional, but part of the definition of the slotdog formed from a network of geometries comprising straight connectors and axial end entities.

| Entities | Constraint | Type | Order |
|---|---|---|---|
| Straight connector and axial end | Tangent-at-edge (x4) | Traditional | N/A |
| Tangent end lines | Parallel | If-possible | 1 |
| Smaller axial end | Radius/half-angle/cone-slide | If-possible | 2 |
| Larger axial end | Radius/half-angle/cone-slide | If-possible | 3 |
| Furthest axial end | Fix | If-possible | 4 |
| Closest axial end | Fix | If-possible | 5 |
| Both axial ends | Distance | If-possible | 6 |

The constraints listed above, along with special angle edit behaviour, fit into the wider variational CAD system as follows:

| Behaviour | Order |
|---|---|
| Special angle edit behaviours (fix-if-possible on axial ends when directly editing the angle between tangent end lines) | 1 |
| General synchronous behaviours | 2 |
| New slotdog behaviours as listed above | 3 |

The additional special behaviours referred to above may be achieved via special filters on slotdogs entities. The filters avoid finding other geometric relationships between slotdog entities; avoid treating axial end entities as blends, or ensure rotation points generated on straight connectors are projected onto the relevant end axis.

The special behaviours may be equally applied to a slotdog already defined in the system and a slotdog that is automatically discovered. To provide the best behaviour when editing models, it is advantageous for a variational system to be able to discover slotdog features on-the-fly, just as it would discover other model relationships such as parallel or tangent. This is because it allows the variational system to work on imported and natively created models and it means the user is not forced to define a slotdog feature to get intuitive behaviour.

Figure 10:
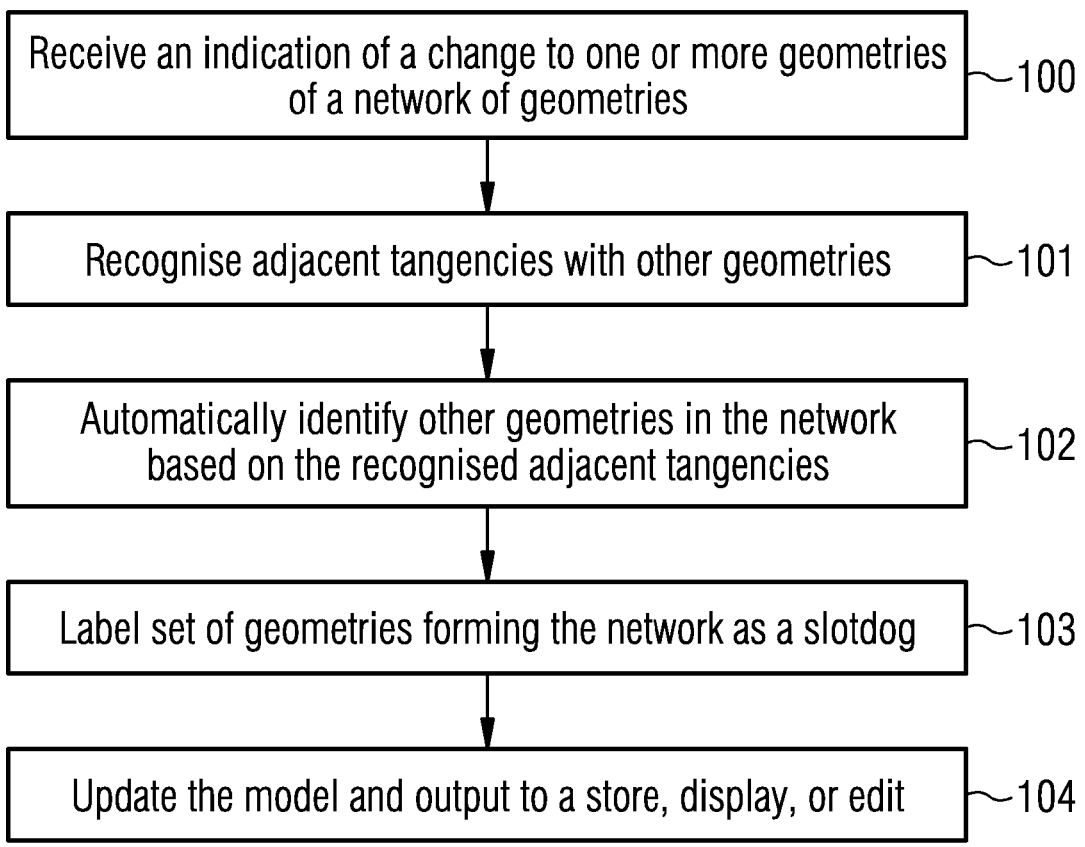
FIG. 10 is a flow diagram of a process in accordance with disclosed embodiments.

FIG. 10 is a flow diagram of a basic method of identifying a network of geometries that form a slotdog. This identification may be the result of receiving an indication of a change to one or more, but not all of the geometries, or receiving all or part of a model containing potential slotdogs. The one or more geometries of the network of geometries may be referred to as a seed of a slotdog. Receiving a seed of a slotdog may cause an identification process to start. Alternatively, all of the geometries of a network of geometries may be received and the determination of whether that network forms a slotdog by virtue of the relationship between the geometries made from that. What is received may be all or part of a model containing multiple networks of geometries. The identified slotdog may then be edited in a method of editing a model of an object represented in a variational system, for example as in FIG. 11. Equally, the editing method may be applied to slotdogs which have been previously labelled as such, not just to slotdogs identified at the time.

The automatic identification may occur when an indication of a change to one or more geometries comprising one of a network of geometries all connected through adjacent tangencies is received 100. Adjacent tangencies of the seed with other geometries in the network are recognised 101 and other geometries in the network are automatically identified 102 based on the recognised adjacent tangencies. This is explained in more detail with respect to FIG. 12. The set of geometries forming the identified network are labelled 103 as a slotdog, and the model is then updated 104 by displaying, storing, or editing the identified slotdog. The alternative to this is that all the geometries representing an object in the model are received and each one of them tested to determine whether the requirements of tangency indicating the presence of a slotdog are met. If so, that set of geometries is labelled as a slotdog and may be stored or further processing applied.

Figure 11:
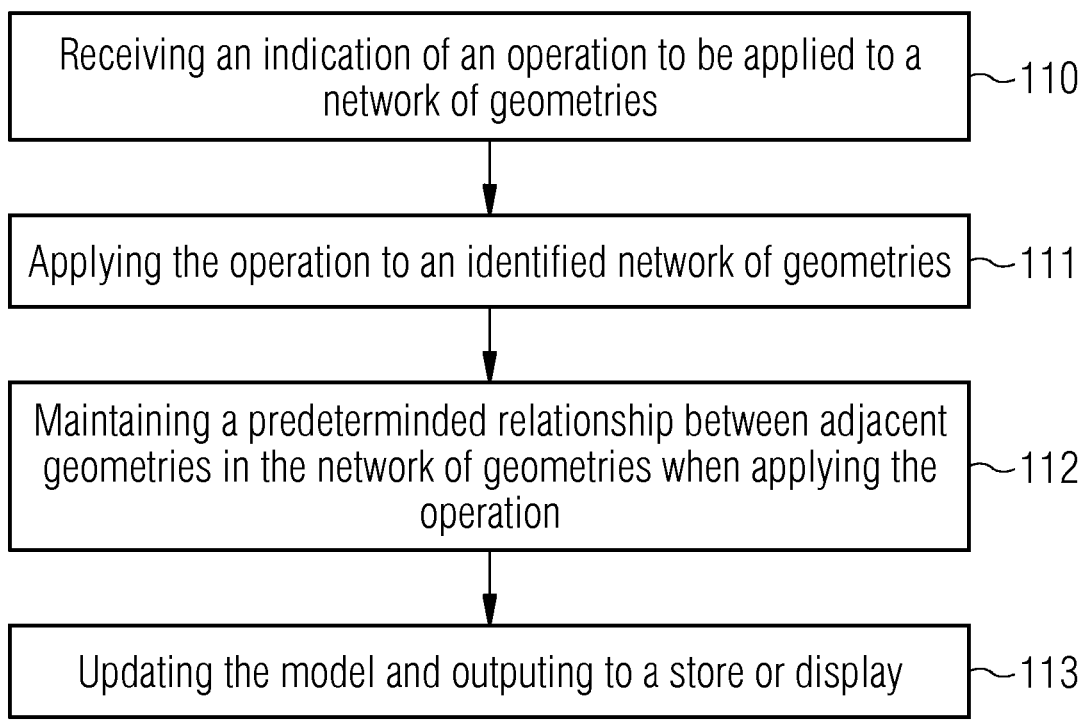
FIG. 11 is a flow diagram of a process in accordance with the disclosed embodiments, and, FIG. 12 is a flow diagram of a method of automatically discovering a slotdog in accordance with the disclosed embodiments.

FIG. 11 shows an example of a method of editing a model representing an object in a variational system. An indication of an operation to be applied to a network of geometries forming a slotdog is received 110. The slotdog comprises a network of geometries all connected through adjacent tangencies, the geometries comprising axial end entities and straight connectors. The operation is applied 111 to the seed, whilst maintaining 112 a predetermined relationship between adjacent geometries of the slotdog. The model is updated 113 to reflect the applied operation and output to a display or stored for later processing. The editing may be applied to slotdogs which have been previously labelled, or to those which are discovered on the fly.

Figure 12:
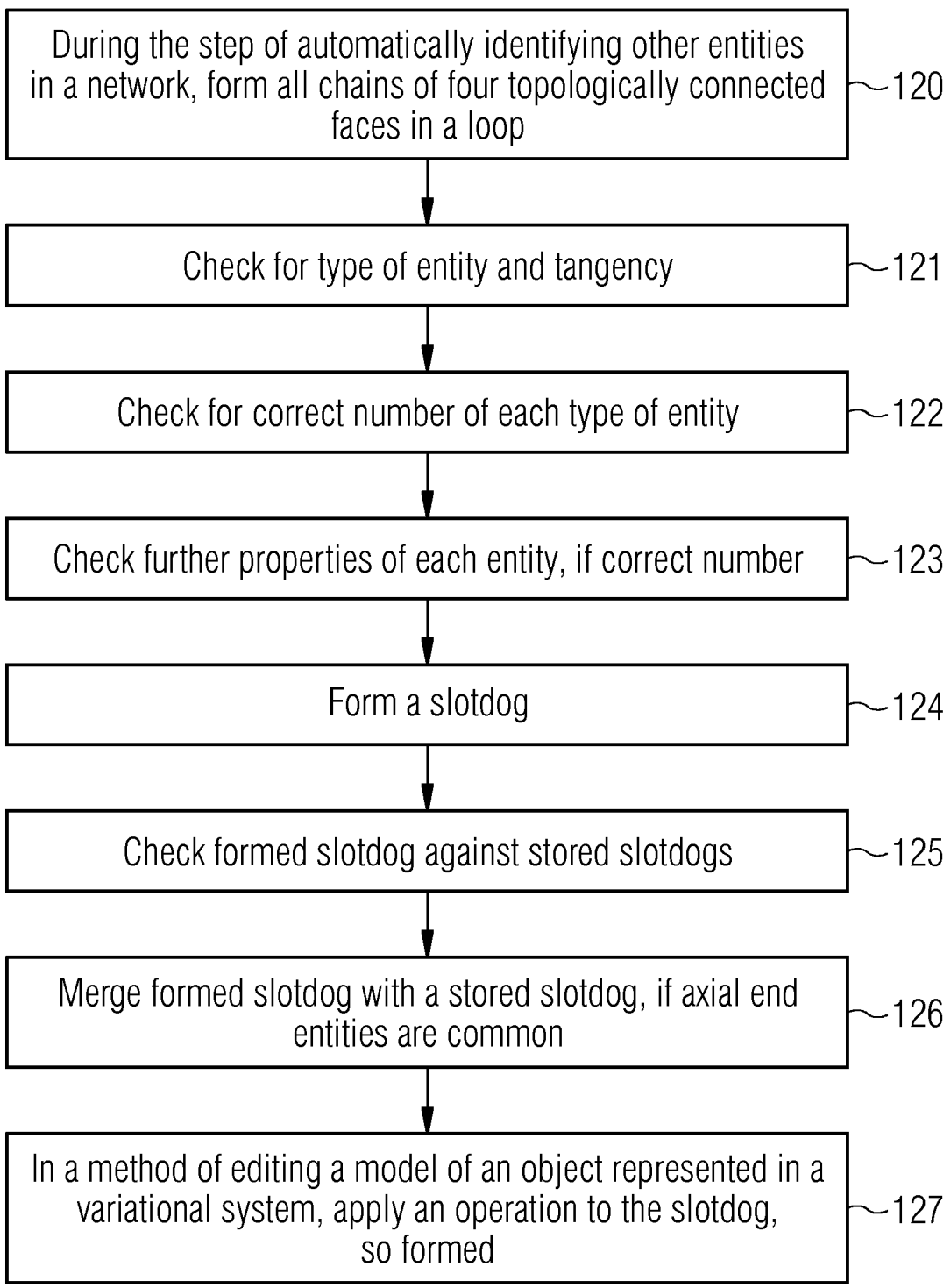

The process for discovering slotdogs on-the-fly during edits results in the same slotdog being discovered whichever seed face within the slotdog is the starting point. An example is shown in FIG. 12. The automatic discovery may be done by forming 120 all chains of four topologically connected faces in a loop that satisfy the simple slotdog definition checks 121, such as type of geometry, or entity—i.e. axial end entity or straight connector—and tangency—the entities are tangent at their connections. A check 122 is then made of the entities in the loops against the remaining slotdog definitions, i.e. that there are two axial end entities and two straight connectors, the straight connectors not being topologically connected, i.e. not directly adjacent to one another, that each plane may be replaced by multiple identical planes, that the straight connectors are not coincident and the two axial end entities chosen from cylinders, cones or circles; that if cones, the cones have the same half-angle and aligned axes; that if cylinders or circles, the cylinders or circles have parallel axes. Further checks 123 may include that the axial ends curve out from the centre of the slotdog, and that if the straight connectors are faces, then the majority of the faces lie between the two axial end entities. If the checks carried out are successful, a slotdog is formed 124. A check 125 may be made against stored slotdogs and if both axial end entities are shared with a previously defined slotdog, then the two slotdogs may be merged 126 and the final slotdog definition may be cached for future reuse within the system. A method of editing a model may be applied 127 to the slotdog so formed. Having discovered the slotdog, the selected operation in steps 103 and 113 may be applied.

Figure 7:
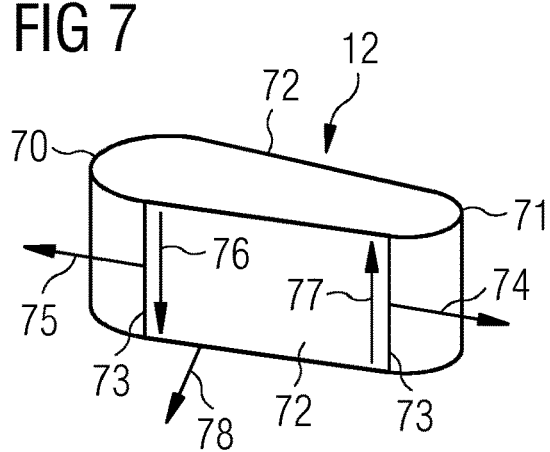
FIG. 7 illustrates tangent end lines correctly pointing away from each other.
Figure 8A:
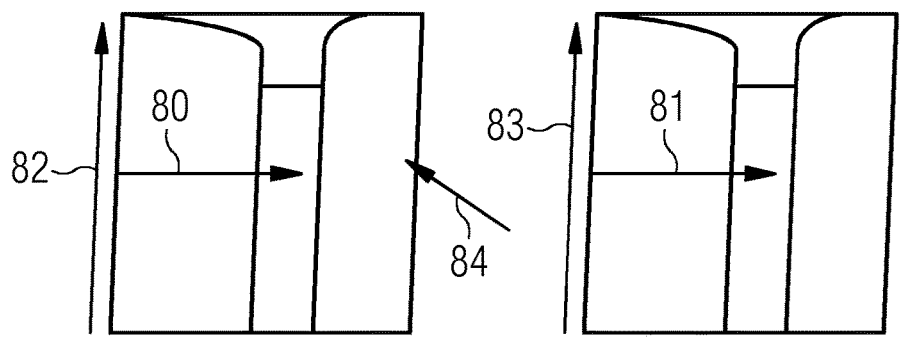
FIGS. 8a and 8b illustrate examples of incorrectly oriented tangent end lines.
Figure 8B:
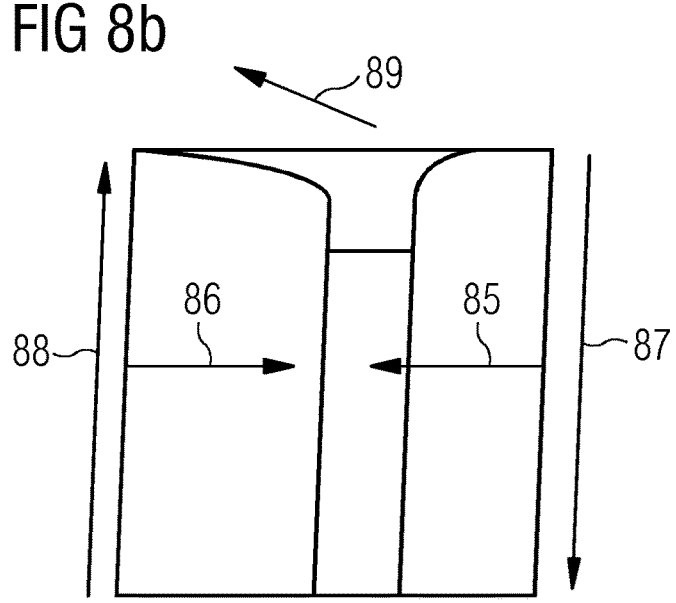

The need for the axial end entities to curve out from the centre of the slot may be achieved by ensuring that the tangent end lines on either side of the straight connector point away from each other, for example as illustrated in FIG. 7. For a slotdog 12 comprising two cylinders 70, 71 having different radii and two faces 72 connecting the cylinders at tangencies 73, which shows tangent end lines 74, 75 correctly pointing away from each other. FIGS. 8*a* and 8*b* illustrate examples of incorrectly oriented tangent end lines. In FIG. 8*a*, both tangent end lines 80, 81 point in the same direction. In FIG. 8*b*, the tangent end lines 85, 86 point towards one another. (The arrows 76, 77, 78 in FIG. 7, 82, 83, 84 in FIG. 8*a* and 87, 88, 89 in FIG. 8*b* are properties of the boundary representation (B-rep) model indicating directions of the edges within that face in which they are drawn).

When the straight connectors are faces, to ensure that the majority of the straight connectors lie between the two axial ends, i.e. between the two cylindrical or conical ends, vertices 90*a*, 90*b*, 91*a*, 91*b* of the connector face 92 are checked to make sure they lie behind the adjacent tangent end lines 93, 94. As shown in FIG. 9, the vertices lie in front of the tangent end lines, so the face 92 cannot be a straight connector. The two dashed lines 95, 96 between the arrows 93 and 94 define the region between the two axial ends. More of the straight connector face should be in this region than not, so as in FIG. 9 the straight connector face is mostly not in the region, which is not acceptable.

In summary, embodiments may include those in which the identification comprises receiving an indication relating to one or more geometries comprising a network of geometries. In the case where not all the geometries in the network are received, the received one or more geometries may be referred to as a seed of a slotdog. From the seed, all other geometries in the network of geometries forming the slotdog may be determined. Alternatively, the method may involve receiving a model of an object and checking that all geometries in the model of the object are connected together through adjacent tangencies forming a slotdog, then labelling the slotdog. In another embodiment, the method may involve receiving a complete model or large portion of a complete model, rather than a model of an individual object, or seeds of a slotdog, and all possible slotdogs within the complete model may be identified by using the methods described for identification of a single slotdog.

An operating system included in the data processing system enables an output from the system to be displayed to the user on display 6 and the user to interact with the system. Examples of operating systems that may be used in a data processing system may include Microsoft Windows™, Linux™, UNIX™, iOS™, and Android™ operating systems.

In addition, it should be appreciated that data processing system 1 may be implemented as in a networked environment, distributed system environment, virtual machines in a virtual machine architecture, and/or cloud environment. For example, the processor 2 and associated components may correspond to a virtual machine executing in a virtual machine environment of one or more servers. Examples of virtual machine architectures include VMware ESCi, Microsoft Hyper-V, Xen, and KVM.

Those of ordinary skill in the art will appreciate that the hardware depicted for the data processing system 1 may vary for particular implementations. For example the data processing system 1 in this example may correspond to a computer, workstation, and/or a server. However, it should be appreciated that alternative embodiments of a data processing system may be configured with corresponding or alternative components such as in the form of a mobile phone, tablet, controller board or any other system that is operative to process data and carry out functionality and features described herein associated with the operation of a data processing system, computer, processor, and/or a controller discussed herein. The depicted example is provided for the purpose of explanation only and is not meant to imply architectural limitations with respect to the present disclosure.

The data processing system 1 may be connected to the network (not a part of data processing system 1), which can be any public or private data processing system network or combination of networks, as known to those of skill in the art, including the Internet. Data processing system 1 can communicate over the network with one or more other data processing systems such as a server (also not part of the data processing system 1). However, an alternative data processing system may correspond to a plurality of data processing systems implemented as part of a distributed system in which processors associated with several data processing systems may be in communication by way of one or more network connections and may collectively perform tasks described as being performed by a single data processing system. Thus, it is to be understood that when referring to a data processing system, such a system may be implemented across several data processing systems organized in a distributed system in communication with each other via a network.

Of course, those of skill in the art will recognize that, unless specifically indicated or required by the sequence of operations, certain steps in the processes described above may be omitted, performed concurrently or sequentially, or performed in a different order.

Those skilled in the art will recognize that, for simplicity and clarity, the full structure and operation of all data processing systems suitable for use with the present disclosure is not being depicted or described herein. Instead, only so much of a data processing system as is unique to the present disclosure or necessary for an understanding of the present disclosure is depicted and described. The remainder of the construction and operation of data processing system 1 may conform to any of the various current implementations and practices known in the art.

It is important to note that while the disclosure includes a description in the context of a fully functional system, those skilled in the art will appreciate that at least portions of the mechanism of the present disclosure are capable of being distributed in the form of instructions contained within a machine-usable, computer-usable, or computer-readable medium in any of a variety of forms, and that the present disclosure applies equally regardless of the particular type of instruction or signal bearing medium or storage medium utilized to actually carry out the distribution. Examples of machine usable/readable or computer usable/readable mediums include: nonvolatile, hard-coded type mediums such as read only memories (ROMs) or erasable, electrically programmable read only memories (EEPROMs), and user-recordable type mediums such as floppy disks, hard disk drives and compact disk read only memories (CD-ROMs) or digital versatile disks (DVDs).

Although an exemplary embodiment of the present disclosure has been described in detail, those skilled in the art will understand that various changes, substitutions, variations, and improvements disclosed herein may be made without departing from the spirit and scope of the disclosure in its broadest form.

None of the description in the present application should be read as implying that any particular element, step, or function is an essential element which must be included in the claim scope: the scope of patented subject matter is defined only by the allowed claims. Moreover, none of these claims are intended to invoke 35 USC § 112(f) unless the exact words "means for" are followed by a participle.

The invention claimed is:

1. A method of modifying manufacturing instructions for manufacturing an object, comprising:
   receiving an edit of a 3D CAD model to be applied to the manufacturing instructions;
   defining a seed of a slotdog as one or more, but not all, of a network of geometries that form the 3D CAD model and that define a slotdog, wherein a slotdog comprises four faces, geometries, or entities, that are topologically connected in a loop, where each entity is connected to exactly two of the other entities, or more than four faces, geometries, or entities which may be merged and treated as one;
   identifying slotdogs within the 3D CAD model,
   wherein, if a slotdog is identified,
      applying the edit whilst maintaining a predefined relationship of the slotdog with all the geometries of the network, the predefined relationship comprising at least that tangency between adjacent geometries is always maintained, and
      updating the 3D CAD model and manufacturing instructions to reflect the edit applied; and
   receiving one or more geometries comprising all or part of one or more networks of geometries in the 3D CAD model; and
   automatically identifying the network of geometries by feature recognition of a subset of geometries in a neighborhood of the received geometries,
   wherein automatically identifying the network of geometries further comprises:
      forming all chains of the geometries in a loop; and
      checking for type of geometry and tangency, checking for number of each type of geometry.

2. The method according to claim 1, further comprising: checking additional properties of the geometry.

3. The method according to claim 1, further comprising: checking identified slotdogs against one or more stored slotdogs; and
merging formed identified slotdogs with a stored slotdog, if axial end entities are common.

4. The method according to claim 1, further comprising: identifying a plurality of networks of geometries that form the 3D CAD model by receiving one or more geometries comprising all or part of one or more networks of geometries in the 3D CAD model for each received network of geometries.

5. The method according to claim 1,
wherein the edit comprises one of, or a combination of translation, rotation, radius change, offset, scaling, stretching, or tapering of the slotdog as a whole or any part thereof.

6. The method according to claim 1,
wherein the geometries comprise one or more axial end entities and straight connectors.

7. The method according to claim 6,
wherein the network of geometries comprises two axial end entities and two straight connectors, wherein the straight connectors are not coincident.

8. The method according to claim 7,
wherein the two axial end entities and two straight connectors are topologically connected in a loop, each being connected to exactly two of the other entities.

9. The method according to claim 6,
wherein tangency between the straight connectors and faces of the axial end entities is always maintained.

10. The method according to claim 9,
wherein tangency between a straight connector and an axial end entity is predefined as one of a number of different possible directions in which to move the axial end entity; or is predefined as changing the radius of the axial end entity, or is predefined as maintaining the radius of the axial end entity; or is predefined as a combination of direction of movement of the axial end entity and change or maintenance of radius of the axial end entity.

11. The method according to claim 6,
wherein the axial end entities comprise one of cylinders, cones or circles.

12. The method according to claim 11,
wherein the cones have the same half-angle and aligned axes.

13. The method according to claim 11,
wherein the cylinders or circles, have parallel axes.

14. The method according to claim 11,
wherein the axial end entities curve out from the center of the slotdog.

15. The method according to claim 6,
wherein at least one of the following constraints are applied, provided that the constraints do not override key synchronous behaviors defined in the system, when tangent end lines are parallel they remain parallel, a radius or half-angle or cone-slide of each axial end is locked, a radius or half-angle or cone-slide of the smaller axial end is locked, the axis of each axial end remains stationary, the axial end furthest away from the edit remains stationary, or the length remains rigid if both axial ends are moving.

16. The method according to claim 1,
wherein, before applying the edit, the slotdog has been identified as a slotdog.

17. A data processing system, comprising:
a processor; and
an accessible memory,
wherein the data processing system is configured to carry out a method of modifying manufacturing instructions for manufacturing an object, comprising:
receiving an edit of a 3D CAD model to be applied to the manufacturing instructions;
defining a seed of a slotdog as one or more, but not all, of a network of geometries that form the 3D CAD model and that define a slotdog, wherein a slotdog comprises four faces, geometries, or entities, that are topologically connected in a loop, where each entity is connected to exactly two of the other entities, or more than four faces, geometries, or entities which may be merged and treated as one;
identifying slotdogs within the 3D CAD model,
wherein, if a slotdog is identified,
applying the edit whilst maintaining a predefined relationship of the slotdog with all the geometries of the network, the predefined relationship comprising at least that tangency between adjacent geometries is always maintained; and
updating the 3D CAD model and manufacturing instructions to reflect the edit applied;
receiving one or more geometries comprising all or part of one or more networks of geometries in the 3D CAD model; and
automatically identifying the network of geometries by feature recognition of a subset of geometries in a neighborhood of the received geometries,
wherein automatically identifying the network of geometries further comprises:
forming all chains of the geometries in a loop; and
checking for type of geometry and tangency, checking for number of each type of geometry.

18. A non-transitory computer-readable medium encoded with executable instructions that, when executed, cause one or more data processing systems to perform a method of modifying manufacturing instructions for manufacturing an object, the method performed on a data processing system, the method comprising:
receiving an edit of a 3D CAD model to be applied to the manufacturing instructions;
defining a seed of a slotdog as one or more, but not all, of a network of geometries that form the 3D CAD model and that define a slotdog, wherein a slotdog comprises four faces, geometries, or entities, that are topologically connected in a loop, where each entity is connected to exactly two of the other entities, or more than four faces, geometries, or entities which may be merged and treated as one; and
identifying slotdogs within the 3D CAD model,
wherein, if a slotdog is identified,
applying the edit whilst maintaining a predefined relationship of the slotdog with all the geometries of the network, the predefined relationship comprising at least that tangency between adjacent geometries is always maintained; and
updating the 3D CAD model and manufacturing instructions to reflect the edit applied;
receiving one or more geometries comprising all or part of one or more networks of geometries in the 3D CAD model; and
automatically identifying the network of geometries by feature recognition of a subset of geometries in a neighborhood of the received geometries,
wherein automatically identifying the network of geometries further comprises:
forming all chains of the geometries in a loop; and
checking for type of geometry and tangency, checking for number of each type of geometry.

* * * * *